United States Patent
Jung

(10) Patent No.: US 6,812,828 B2
(45) Date of Patent: Nov. 2, 2004

(54) METHOD AND DEVICE FOR THE AUTOMATED ACTUATION OF A CLUTCH

(75) Inventor: Mario Jung, Sinzheim (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 104 days.

(21) Appl. No.: 10/227,594

(22) Filed: Aug. 23, 2002

(65) Prior Publication Data

US 2003/0043032 A1 Mar. 6, 2003

Related U.S. Application Data

(63) Continuation of application No. PCT/DE01/00219, filed on Jan. 18, 2001.

(30) Foreign Application Priority Data

Feb. 24, 2000 (DE) .......................................... 100 08 719

(51) Int. Cl.[7] ................................................ B60Q 1/00
(52) U.S. Cl. ..................... 340/425.5; 340/439; 340/456; 340/438; 340/453; 701/51; 477/79; 477/80; 477/67
(58) Field of Search .............................. 340/425.5, 439, 340/456, 438, 453; 701/51; 477/79, 80, 67

(56) References Cited

U.S. PATENT DOCUMENTS

| | | | | |
|---|---|---|---|---|
| 4,295,551 A | * | 10/1981 | Zimmermann et al. | ........ 477/89 |
| 4,905,544 A | * | 3/1990 | Ganoung | ..................... 477/109 |
| 5,161,174 A | * | 11/1992 | Pigozzi | ......................... 377/28 |
| 5,896,083 A | * | 4/1999 | Weisman et al. | ........... 340/438 |
| 5,902,211 A | | 5/1999 | Jones et al. | |
| 6,040,768 A | * | 3/2000 | Drexl | .......................... 340/453 |
| 6,602,161 B2 | * | 8/2003 | Hemmingsen et al. | ........ 477/79 |

FOREIGN PATENT DOCUMENTS

DE 198 10 033 A1 9/1999

* cited by examiner

Primary Examiner—Daniel J. Wu
Assistant Examiner—Tai T. Nguyen
(74) Attorney, Agent, or Firm—Darby & Darby

(57) ABSTRACT

The invention relates to a motor vehicle comprising a drive motor and a gearbox with a device for automatically actuating a clutch in the drivetrain, and to a control method. According to said method, if the gear ratio is less than a threshold value and the actuation of a driving pedal is not equal to zero and is less than a threshold value, warning measures are initiated to alert the driver to misuse.

15 Claims, 2 Drawing Sheets

METHOD AND DEVICE FOR THE AUTOMATED ACTUATION OF A CLUTCH

CROSS-REFERENCE TO RELATED APPLICATION

This is a continuation of international application Serial No. PCT/DE01/00219, filed Jan. 18, 2001, which is hereby incorporated by reference in its entirety.

TECHNICAL FIELD

The invention relates to a method for the automated actuation of a clutch in the drive train of a motor vehicle equipped with a drive motor and gearbox and to a device for this purpose.

BACKGROUND

Methods and devices of this kind for clutches which can be actuated automatically are known for example from DE 44 26 260 or DE 195 07 847. With automated clutch systems of this kind the actuation of the clutch is undertaken automatically by means of an actuator and the clutch pedal can be omitted. The driver of the vehicle equipped with an automatic clutch of this kind can influence the automated clutch actuation for example by operating the drive pedal, such as the accelerator.

Where a stretch of the road is inclined it is now possible for the vehicle to be held stationary or substantially stationary with a slight actuation of the drive pedal by the driver through corresponding engagement of the clutch, since the torque transferred by the clutch through the control using the actuation of the drive pedal is sufficient to hold the vehicle on the slope against the downhill output force. Also driving is possible with very slight actuation of the drive pedal whereby the clutch constantly slips at low drive speed over a longer time.

In the event of longer or repeated slipping states at low drive speed or with stationary states of the vehicle on a hill or even with numerous repeated even short stopping states this can lead to the clutch rapidly wearing out prematurely. There is also the problem that the driver of the vehicle as a rule has no knowledge of the increased wear on the clutch.

SUMMARY

The object of the invention is to detect critical stopping states of the vehicle when the clutch is partly engaged, for example on a slope or longer slipping states and to alert the driver of a situation which is critical for the service life of the clutch and/or to initiate remedying measures.

According to the invention this is achieved by a method for the automated actuation of a clutch in the drive train of a motor vehicle equipped with a drive motor and a transmission, with a device for the automated actuation of the clutch with an electronic control unit and actuator for actuating the clutch, with a drive pedal for controlling the drive motor, in that the following steps are carried out:

detecting a transmission speed n of substantially zero or less than a threshold value;

detecting a measurement of drive pedal actuation x which is not equal to zero and less than a predeterminable threshold value;

with the presence of these conditions initiating warning measures to alert the driver to a misuse situation and/or remedying measures.

Through this overall combination of a transmission speed of substantially zero or less than a predeterminable threshold value and a drive pedal actuation on the part of the driver within a predetermination actuating range which is other than zero and less than a predeterminable threshold value a stopping situation on a hill or a very slow drive speed of the vehicle with the clutch slipping is detected. A warning or remedying measure can then be initiated.

According to the invention the object can also be achieved if the following steps are carried out:

detecting a slip which is greater than a threshold value;

detecting a measurement of the drive pedal actuation x which is other than zero and less than a predeterminable threshold value;

with the presence of these conditions initiating warning measures to alert the driver to a misuse situation.

The above definition of slip is to mean the difference between the engine speed and the gearbox speed wherein the engine speed can be determined by means of an engine speed sensor and the gearbox speed can be determined by a gearbox speed sensor or by calculations using a wheel speed. The condition of the slip greater than a threshold value means that with a given engine speed the driving speed with a slipping clutch is very low which results in increased wear of the clutch. The threshold value for the slip can be for example at about 300 1/min to 700 1/min, such as preferably 500 1/min, so that warning measures and/or remedying measures are controlled when the difference between the engine speed and gearbox speed exceeds this value , provided that other conditions also exist. It is advantageous if the threshold value for the slip is below the value of the idling speed of the engine.

According to a further inventive idea the object of the invention is also achieved in that the following steps are carried out:

detecting a gearbox speed n greater than a threshold value detecting a measurement of a drive pedal actuation x which is other than zero and less than a predeterminable threshold value;

with the presence of these conditions warning measures are introduced so that the driver is alerted to a misuse situation.

According to the invention it is expedient if for actuating the drive pedal a range is provided which is greater than nil and smaller than a predeterminable threshold value. This is therefore expedient because it is not advisable to initiate warning measures if the accelerator pedal is not activated or even to engage the clutch if the accelerator pedal is not activated. It is also expedient to rule out the full throttle area since with full throttle a warning is less advisable since the driver deliberately carries out this maximum drive pedal actuation.

It is accordingly expedient if the drive pedal actuation according to the invention is in the region from 3%<x<75%.

It is thereby advantageous if the gearbox speed n is greater than a predeterminable threshold value, thus for example 500 1/min. It is particularly advantageous if the threshold value of the gearbox speed is below the idling speed of the drive motor.

It is thereby expedient if the measurement x of the drive pedal actuation can be detected by means of a drive pedal sensor.

It is also advantageous if a drive pedal actuation x which differs from zero can be detected by means of an idling switch.

According to the invention it is expedient if the speed is determined by means of a gearbox speed sensor. It can also be expedient if the speed is determined by means of a wheel speed sensor taking into account the gearbox transmission ratio and where necessary a drive train transmission ratio.

According to the invention it is expedient if the slip is determined as a difference between an engine speed and the gearbox speed from values of the engine speed and a gearbox speed. The engine speed can thereby be determined for example from an engine speed sensor and the gearbox speed from a gearbox speed sensor or can be determined from a wheel speed by means of the transmission ratio of the gearbox and the drive train transmission ratio.

According to the inventive idea it is expedient if the warning measures are produced immediately after the existence of the conditions which are necessary for same. It can also be expedient if the warning measures are produced only after the lapse of a waiting time after the existence of the conditions which are necessary for same. It can also be expedient if the warning measures are produced after the existence of the conditions required for same and a clutch temperature which is raised beyond a threshold value. In this respect reference is made to DE 196 02 006 whose contents are expressly included in the disclosure of the present application documents.

An advantageous warning measure according to the invention can be produced through control of an optical indicator, such as a warning light coming on, or a warning light flashing or a gear display.

The warning measure can also be introduced in advantageous manner through a control which produces an acoustic signal such as a warning tone.

Furthermore it is expedient if the warning measure or remedying measure is initiated when the clutch is engaged.

It can also be expedient if a warning measure is initiated through a controlled at least partial engagement or disengagement of the clutch so that the drive train is caused to pulsate.

The invention further relates to a device for an automated clutch for carrying out the method described above.

BRIEF DESCRIPTION OF THE DRAWING FIGURES

An embodiment of the invention will now be explained in further detail with reference to the drawings in which.

DETAILED DESCRIPTION OF THE PREFERRED EMBODIMENT

Figure 1:
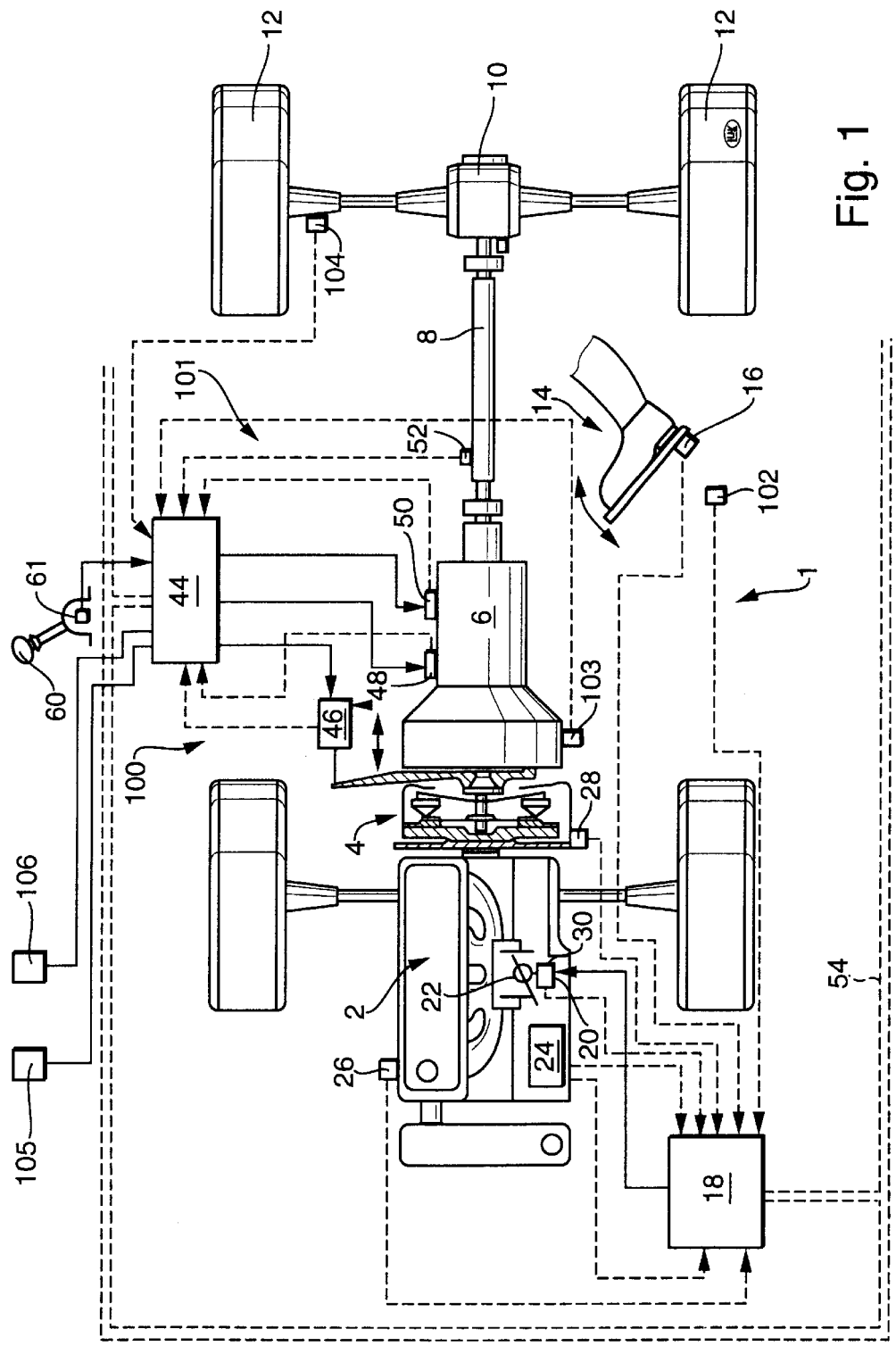
FIG. 1 shows a vehicle with a drive train, gear actuating device.

FIG. 1 shows a motor vehicle 1 with a drive train which contains a drive motor 2, clutch 4 and gearbox 6. The wheels 12 of the vehicle 1 are driven through a cardan shaft 8 and differential 10. There is also a transmission ratio selection device 60 such as a selector lever, with sensor 61 and a control device 18, 44 as block circuit diagram. The clutch is controlled by means of a device 100 for the automated actuation in the engaged state. This includes at least an actuator 46 for actuating the clutch and an electronic control unit 44 for controlling the actuator. The gearbox 6 is controlled by means of a device 101 for the automated actuation such as gear selection. This includes at least an actuator 48, 50 for actuating the gearbox and an electronic control unit 44 for controlling the at least one actuator.

The control unit 18, 44 can be formed as one unit or in structurally and/or functionally separated partial areas. The control unit 18 thereby controls the drive motor 2 via the drive pedal actuation.

If the control device 18, 44 is formed in structurally and/or functionally separate partial areas these can be connected together for example through a CAN Bus 54 or another electrical connection for data exchange.

The device for changing the transmission ratio of the gearbox comprises at least one actuator 48, 50 and a control unit wherein the transmission ratio can be changed by controlling the actuator.

Region 44 of the control device receives signals which represent at least the transmission state of the clutch 2 and the transmission ratio set in the gearbox 6, as well as signals from a sensor 52 for the output speed and a sensor 61 at the transmission selection device 60.

Region 18 of the control device controls the combustion engine 2 through for example an adjustment of the throttle valve 30. Signals are received from sensors 26 for the intake pipe pressure, 24 for coolant temperature, 28 for engine speed, 20 for the setting of the throttle valve 22 and 16 for a drive pedal actuation 14. Furthermore an idling switch 102 can be provided which detects whether the drive pedal is not actuated.

A gearbox speed sensor 103 or a wheel speed sensor 10 can be used to detect a vehicle speed or a corresponding gearbox speed.

As a warning for the driver an acoustic warning signal can be generated by means of the speaker 105. Also an optical signal can be produced through a warning light 106 or some other display such as a flashing gear indicator.

Likewise the clutch can be operated with pulsating action as warning, so that vibrations are produced in the drive train which the driver would then notice to be uncomfortable.

As a remedying measure the clutch can be deliberately engaged so that the driver has to change the drive pedal actuation and actuate a brake so that the clutch is not further loaded.

According to a further embodiment it is expedient if when recognising stopping on a hill by means of a partially engaged clutch up to a clutch temperature of for example 180° C.–220° C. no warning takes place. If the clutch temperature rises further after a predeterminable waiting time of about 3 to 5 seconds the gear display 106 starts to flash. Beyond a threshold temperature of about 300° C. the clutch is engaged. This can take place slowly at the start after a waiting time of about 3 to 5 seconds and can take place immediately without any waiting time if a higher threshold temperature of about 350° C. is exceeded. An acoustic warning signal can be controlled on exceeding a further threshold temperature.

Figure 2:
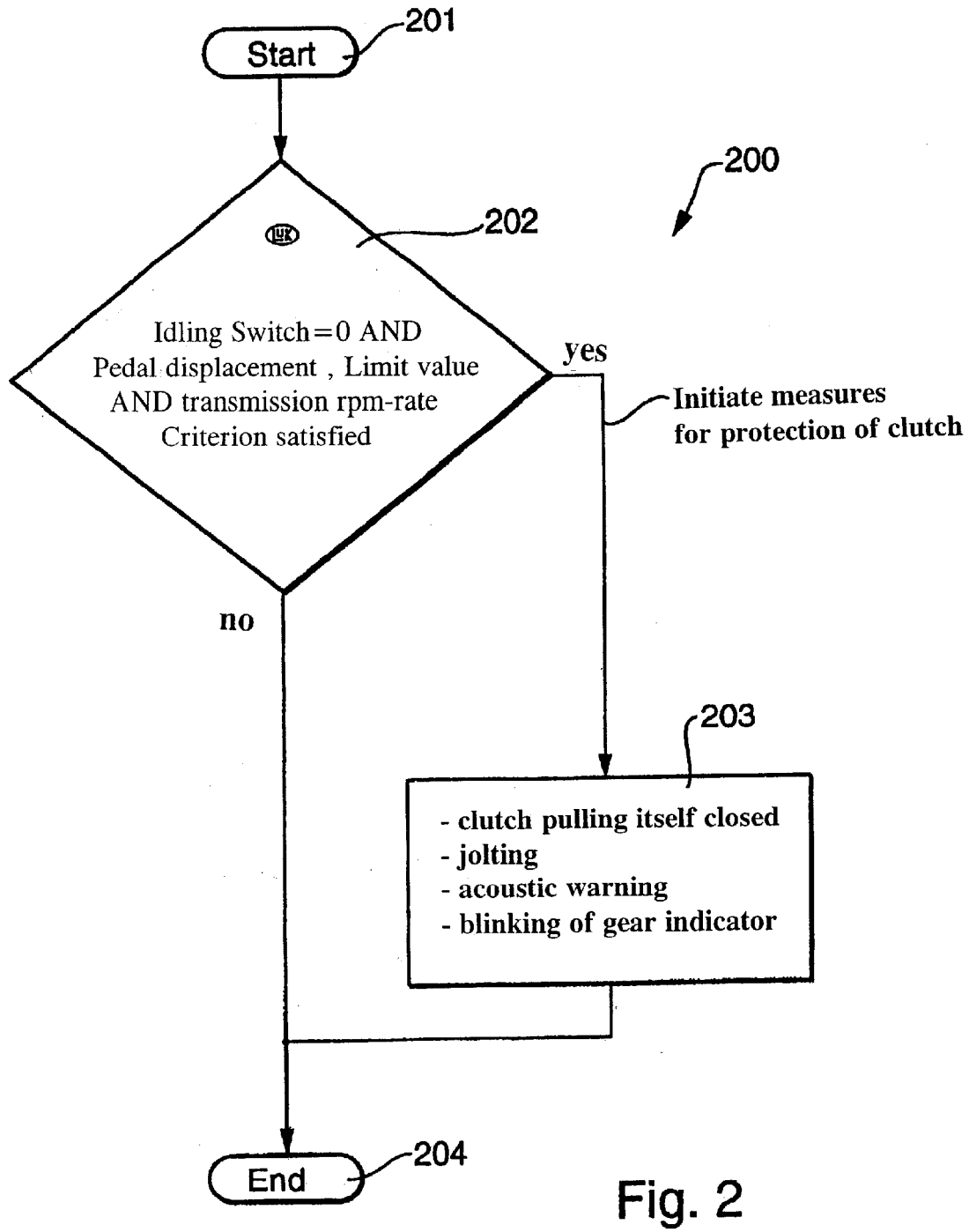
FIG. 2 shows a block circuit diagram to illustrate an embodiment of a method according to the invention.

FIG. 2 shows a block circuit diagram 200 for illustrating an embodiment of a method according to the invention. In block 201 the method according to the invention is started or introduced. In block 202 it is asked whether the idling switch is =0, that is whether the drive pedal has been actuated even just slightly and whether a pedal value of the drive pedal is less than a predeterminable threshold value and whether a gearbox speed condition exists. The gearbox speed ratio condition can according to the above be that either the gearbox speed is substantially equal to zero or the gearbox speed is greater than a threshold value of for example 500* 1/min or whether a slip is greater than a threshold value of for example 500* 1/min. Instead of interrogating the idling switch it can also be asked whether the pedal value is greater than a value of substantially zero.

If the conditions questioned in block 202 exist then in block 203 a warning or remedying measure is controlled to protect the clutch such as for example:

meshing, such as engaging of clutch and/or control of a judder through pulsating actuation of the clutch and/or an acoustic warning for example through emitting an acoustic signal such as beeping and/or an optical warning for example by emitting an optical signal such as flashing the gear display or lighting up a warning light or the like.

According to the above description the introduction of protective or warning measures can also be linked through a further condition of the lapse of a waiting time and/or exceeding a certain clutch temperature. For detecting the clutch temperature reference is made to DE 196 02 006.

The method is then ended in block 204 and retrieved again at 201 in a new control interrupt such as control loop.

It is advantageous if as a remedying measure for too high a load on the clutch the clutch in the presence of the relevant conditions is engaged again at least slowly. The speed of closing the clutch can thereby advantageously depend on the gear engaged in the gearbox. It is thereby advantageous if with higher gears the closing speed is selected lower. It can also be advantageous if the speed of closing depends on the vehicle speed and/or on the clutch temperature. By way of example with a higher clutch temperature the closing speed can be higher than with a lower clutch temperature. By way of example with a higher vehicle speed the closing speed can be higher than with a lower closing speed. The closing speed is dependent on vehicle parameters.

It can also be expedient if the waiting time before initiating warning or remedying measures is dependent on vehicle parameters. By way of example the waiting time can be shorter at a higher clutch temperature than at a lower clutch temperature. The waiting time can also be shorter at a higher gear than at a lower gear.

The dependence of the waiting time or closing speed on the vehicle parameters can be brought about by mathematical functions or characteristic values. By way of example the waiting time with the clutch temperature at 200° C. can amount to 8 seconds and at 300° C. to 4 seconds whereby a linear dependence of the waiting time with the temperature can exist between these values.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

Since the subjects of these sub-claims however can also form proper and independent inventions in respect of the prior art known up to the priority date the applicant reserves the right to make them the subject of independent claims or part declarations. They can also contain independent inventions which have a design independent of the subjects of the preceding claims.

These embodiments are not to be regarded as restricting the invention. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. A method for the automated actuation of a clutch in the drive train of a motor vehicle equipped with a drive motor and a gearbox, with a device for the automated actuation of the clutch with an electronic control unit and an actuator for actuating the clutch, with a drive pedal for controlling the drive motor, comprising the steps of:

detecting a gearbox speed n of substantially zero or less than a threshold value;

detecting a measurement of a drive pedal actuation x which is not equal to zero and is less than a predeterminable threshold value;

with the presence of these conditions initiating warning measures to alert a driver to a misuse situation.

2. A method as defined in claim 1, wherein the drive pedal actuation x can be detected by means of a drive pedal sensor.

3. A method as defined in claim 1, wherein the drive pedal actuation x differing from zero can be detected by means of an idling switch.

4. A method as defined in claim 1, wherein the gearbox speed is determined by means of a gearbox speed sensor.

5. A method as defined in claim 1, wherein the gearbox speed is determined by means of a wheel speed sensor taking into account a transmission ratio and where necessary a drive train transmission ratio.

6. A method as defined in claim 1, wherein the step of initiating warning measures takes place immediately after the presence of the conditions required for same.

7. A method as defined in claim 1, wherein the step of initiating warning measures occurs only after the lapse of a waiting time after the presence of the conditions required for same.

8. A method as defined in claim 1, wherein the step of initiating warning measures occurs only after the presence of the conditions required for same and a clutch temperature which has risen above a threshold value.

9. A method as defined in claim 1, wherein the step of initiating warning measures is undertaken by controlling an optical display, such as lighting up a warning light or flashing a warning light or a gear display.

10. A method as defined in claim 1, wherein the step of initiating warning measures is through controlling the generation of an acoustic signal, such as a warning tone.

11. A method as defined in claim 1, wherein the step of initiating warning measures is through engaging the clutch.

12. A method as defined in claim 1, wherein the step of initiating warning measures is through a controlled at least partial engagement or disengagement of the clutch so that the drive train is caused to pulsate.

13. A method for the automated actuation of a clutch in the drive train of a motor vehicle equipped with a drive motor and a gearbox, with a device for the automated actuation of the clutch with an electronic control unit and an actuator for actuating the clutch, with a drive pedal for controlling the drive motor, comprising the steps of:

detecting a slip greater than a threshold value;

detecting a measurement of a drive pedal actuation x which is not equal to zero and is less than a predeterminable threshold value;

with the presence of these conditions initiating warning measures to alert a driver to a misuse situation.

14. A method as defined in claim 13, wherein the slip is determined as a difference between an engine speed and a gearbox speed from values of the engine speed and gearbox speed.

15. A method for the automated actuation of a clutch in the drive train of a motor vehicle equipped with a drive motor and a gearbox, with a device for the automated actuation of the clutch with an electronic control unit and an actuator for actuating the clutch, with a drive pedal for controlling the drive motor, comprising the steps of:

detecting a gearbox speed n greater than a threshold value;

detecting a measurement of a drive pedal actuation x which is not equal to zero and is less than a predeterminable threshold value;

with the presence of these conditions initiating warning measures to alert a driver to a misuse situation.

* * * * *